Jan. 7, 1930.　　　P. K. BUSHNELL　　　1,742,230
EGG BEATER
Filed Jan. 23, 1929
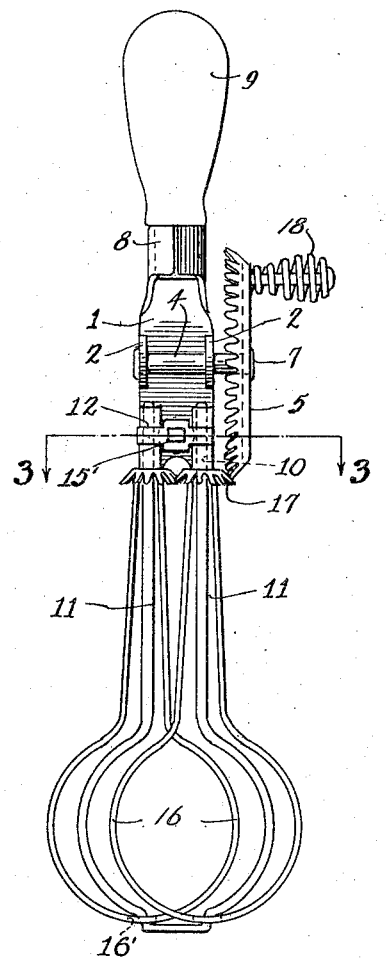
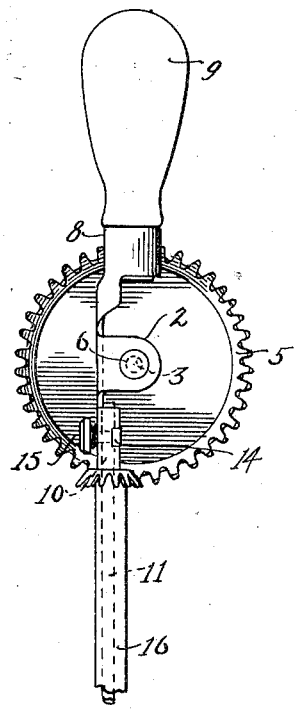
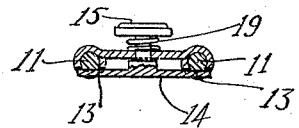
INVENTOR.
BY Porter K. Bushnell
Munn and Co.
ATTORNEYS.

Patented Jan. 7, 1930

1,742,230

UNITED STATES PATENT OFFICE

PORTER K. BUSHNELL, OF BERKELEY, CALIFORNIA

EGG BEATER

Application filed January 23, 1929. Serial No. 334,578.

My invention relates to improvements in egg beaters, and it consists in the combinations, constructions and arrangements hereinafter described and claimed.

An object of my invention is to provide an egg beater that has shanks removably secured to the body portion for permitting the ready cleaning of the shanks and the beater without the necessity of placing the body portion in the water. The device may also be packed in a smaller space due to this particular arrangement, and the beaters may be more easily cleaned.

A further object of my invention is to provide a device of the type described which is extremely simple in construction and which is designed to be stamped out.

Other objects and advantages will appear as the specification proceeds, and the novel features will be particularly pointed out in the appended claims.

My invention is illustrated in the accompanying drawing, in which

Figure 1 is a front elevation of the device;

Figure 2 is a side elevation of the upper portion of the device; and

Figure 3 is a section along the line 3—3 of Figure 1.

In carrying out my invention, I provide a body portion 1 that is stamped out from a sheet of metal and is provided with ears 2 having openings 3 for rotatably supporting a shaft 4. The shaft carries a large bevel gear 5 and has its ends upset as at 6 and 7 for locking the shaft in position.

The top of the body member 1 has extensions 8 that are bent around a handle 9 preferably made of wood. At the lower end of the body member, I provide two sleeves 10. These sleeves are rolled out of the sheet of metal forming the body member, and act as bearings for shanks 11. The sleeves have openings 12 cut therein.

The shanks are circular in cross section, and have notches 13 adapted to be aligned with the openings 12. A spring-pressed keeper 14 (see Figure 3) is carried by the body 1 and has a push button 15 which may be pressed for freeing the keeper 14 from the notches 13. The shanks may now be removed.

From the foregoing description of the various parts of the device, the operation thereof may be readily understood.

The shanks 11 support beaters 16 in the usual manner. The beaters carry bevel gears 17 that mesh with each other and with the large bevel gear 5. A handle 18 is carried by the large bevel gear 5.

The turning of the handle will rotate the beaters 16. When the operator desires to clean the beater, the push button 15 may be depressed against the tension of a spring 19 (see Figure 3) and this will release the two arms of the keeper 14 from the notches 13. The beaters 16 may now be disconnected from the body portion and may be notched separately. Most of the parts such as the body portion 1, the bevel gears, and the beaters, may be stamped out. The other parts are extremely simple in construction, and the whole device may be quickly assembled. The egg beater can therefore be manufactured at a small cost. At the same time, it functions the same as a standard egg beater. The principal advantage is the removability of the beaters 16.

The beaters 16 have elongated openings 16' for permitting their removal from the U-shaped member 11. It should further be noted that the shank 15', carrying the keeper 14, is square to prevent the turning of the keeper.

Although I have shown and described one embodiment of my invention, it is to be understood that the same is susceptible of various changes, and I reserve the right to employ such changes as may come within the scope of the invention as claimed.

I claim:

1. An egg beater comprising a body portion having sleeves with openings cut therein, a pair of shanks removably disposed in said sleeves and having notches registering with the openings, a spring-pressed keeper for holding the shanks to the body portion, beaters carried by the shanks and having bevel gears meshing with each other, a large driving bevel gear meshed with one of the firstnamed bevel gears, and a handle secured to the body portion.

2. An egg beater comprising a body portion stamped from a sheet of metal and being provided with sleeves having openings therein, a U-shaped beater-carrying member having its legs removably received in said sleeves, the legs of the beater having notches cut therein, beaters carried by said member, and a keeper movable through said openings and into registration with the notches for holding the beater-carrying member in place.

PORTER K. BUSHNELL.